United States Patent
Ota

(10) Patent No.: US 8,337,983 B2
(45) Date of Patent: Dec. 25, 2012

(54) HEAT-CURABLE SILICONE RUBBER COMPOSITION FOR RUBBER LAMINATE

(75) Inventor: Kenji Ota, Ichihara (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 522 days.

(21) Appl. No.: 12/521,166

(22) PCT Filed: Dec. 19, 2007

(86) PCT No.: PCT/JP2007/075221
§ 371 (c)(1),
(2), (4) Date: Nov. 4, 2009

(87) PCT Pub. No.: WO2008/078821
PCT Pub. Date: Jul. 3, 2008

(65) Prior Publication Data
US 2010/0055449 A1    Mar. 4, 2010

(30) Foreign Application Priority Data
Dec. 26, 2006  (JP) ................................ 2006-349713

(51) Int. Cl.
*B32B 25/02*  (2006.01)
*B32B 25/04*  (2006.01)
*B32B 25/14*  (2006.01)
*B32B 25/20*  (2006.01)

(52) U.S. Cl. ......... 428/331; 428/420; 428/421; 428/447

(58) Field of Classification Search .......... None
See application file for complete search history.

(56) References Cited

U.S. PATENT DOCUMENTS

| | | | |
|---|---|---|---|
| 4,395,462 A | * | 7/1983 | Polmanteer .................. 428/420 |
| 4,539,357 A | | 9/1985 | Bobear |
| 5,306,558 A | | 4/1994 | Takahashi et al. |
| 2005/0191454 A1 | | 9/2005 | Kaneko et al. |

FOREIGN PATENT DOCUMENTS

| EP | 0238873 A2 | 9/1987 |
|---|---|---|
| EP | 1454740 A1 | 9/2004 |
| JP | 2000193152 A | 7/2000 |
| JP | 2003019772 A | 1/2003 |
| JP | 2003214565 A | 7/2003 |

OTHER PUBLICATIONS

English language translation and abstract for JP 2000-193152 extracted from PAJ database, dated Nov. 10, 2009, 31 pages.
English language translation and abstract for JP 2003-019772 extracted from PAJ database, dated Nov. 10, 2009, 40 pages.
English language translation and abstract for JP 2003-214565 extracted from PAJ database, dated Nov. 10, 2009, 30 pages.
PCT International Search Report for PCT/JP2007/075221, dated Mar. 11, 2008, 3 pages.

* cited by examiner

*Primary Examiner* — Ramsey Zacharia
(74) *Attorney, Agent, or Firm* — Howard & Howard Attorneys PLLC

(57) ABSTRACT

A heat-curable silicone rubber composition for a rubber laminate composed of a silicone-rubber layer and a rubber layer of a material other than silicone, the composition comprising: an alkenyl-containing diorganopolysiloxane (A) which comprises: 50 to 99 mass % of a diorganopolysiloxane (A1) that contains alkenyl groups, is capped at molecular terminals with alkenyl-containing organosilyl groups, and is free of alkenyl groups in side molecular chains; 1 to 50 mass % of an alkenyl-containing diorganopolysiloxane (A2) having two or more alkenyl groups in a side molecular chain; a fine silica powder (B); an organohydrogenpolysiloxane (C) having in one molecule at least two silicon-bonded hydrogen atoms; and an organic peroxide (D).

12 Claims, No Drawings

HEAT-CURABLE SILICONE RUBBER COMPOSITION FOR RUBBER LAMINATE

TECHNICAL FIELD

The present invention relates to a heat-curable silicone rubber composition for a rubber laminate composed of a silicone rubber layer and a rubber layer of a material other than silicone. Herein, the term "material other than silicone" covers organic synthetic rubber materials such as, e.g., fluororubber, acrylic rubber, nitrile rubber, and ethylene-propylene rubber.

BACKGROUND ART

Recent improvements in automobile efficiency and fuel-consumption led to increase of temperature in the automobile engine compartment. As a result such rubber materials as acrylo-nitrile-butadiene copolymers, hydrogenated acrylonitrile-butadiene copolymers, or similar acrylo-nitrile rubbers; acrylic rubbers, copolymers of ethylene and acrylic acid ester, copolymers of acrylic acid ester, ethylene, and vinyl acetate, or similar acrylic rubbers; EPM, EPDM, or similar ethylene-propylene rubbers, etc., which are conventionally used for manufacturing parts exposed to high temperatures of the engine compartment appeared to be insufficient in their resistance to heat. On the other hand, silicone rubbers have normally insufficient resistance to fuel oil and are highly permeable to gases, and therefore their use is limited, especially in areas where they can be exposed to fuel oils or fuel-oil-vapors.

It was proposed to solve the above problem by forming a rubber laminate from silicone rubber and rubber other than silicone rubber. In particular, it was proposed to form a silicone laminate body by incorporating a fluororubber, which is characterized by excellent resistance to chemicals and fuel oils. However, since fluororubber has low surface energy and low reactivity, it is difficult to provide strong bonding between a fluororubber layer and a silicone-rubber layer. Therefore, several studies have been undertaken in order to solve the above problem.

For example, a method was proposed for simultaneous cross-linking and curing a non-cross-linked silicone rubber and a non-cross-linked fluororubber while maintaining both rubbers in mutual contact (see Japanese Unexamined Patent Application Publication (hereinafter referred to as "Kokai") 2000-193152). Furthermore, Kokai 2003-19772 discloses a rubber laminate obtained by simultaneously vulcanizing a layer of fluororubber, which is mixed with a silica-type filler and contains vinylidene-fluoride units, and a layer of silicone rubber, which contains a silica-type filler and a silane-coupling agent that contains amino groups. Kokai 2003-214565 discloses a rubber hose having an intermediate layer of a silicone rubber that contains an adhesive component and is placed between a fluororubber layer and a silicone-rubber layer. However, provision of the adhesive component in the silicone rubber impairs its heat-resistant properties and handling conditions and therefore limits application of the aforementioned laminates. Furthermore, exposure of the laminate to hot environment weakens bonding between the fluororubber layer and the silicone rubber.

DISCLOSURE OF INVENTION

It is an object of the present invention to provide a heat-curable silicone rubber composition that makes it possible to obtain, in a rubber laminate composed of a silicone-rubber layer and a rubber layer other than a silicone rubber, such a silicone-rubber layer that preserves strong bonding to the aforementioned rubber layer other than the silicone-rubber layer, even after exposure to high temperatures.

The heat-curable silicone rubber composition of the invention for a rubber laminate composed of a silicone-rubber layer and a rubber layer of a material other than silicone comprises:
  100 parts by mass of an alkenyl-containing diorganopolysiloxane (A) which comprises:
    50 to 99 mass % of an alkenyl-containing diorganopolysiloxane (A1) that is capped at molecular terminals with alkenyl-containing organosilyl groups, is free of alkenyl groups in side molecular chains, and has a degree of polymerization in the range of 2,500 to 100,000;
    1 to 50 mass % of an alkenyl-containing diorganopolysiloxane (A2) having two or more alkenyl groups in a side molecular chain and having a degree of polymerization in the range of 2,500 to 100,000;
  10 to 100 parts by mass of a fine silica powder (B) having specific surface area in the range of 50 $m^2/g$ to 400 $m^2/g$;
  0.1 to 10 parts by mass of an organohydrogenpolysiloxane (C) having in one molecule at least two silicon-bonded hydrogen atoms; and
  0.1 to 5 part by mass of an organic peroxide (D).

The rubber laminate of the present invention is obtained by simultaneously cross-linking and curing a heat-curable fluororubber composition and a heat-curable silicone composition, both compositions being in contact with each other during cross-linking;
  the aforementioned heat-curable silicone rubber composition comprising:
    100 parts by mass of an alkenyl-containing diorganopolysiloxane (A) that comprises:
      50 to 99 mass % of an alkenyl-containing diorganopolysiloxane (A1) that is capped at molecular terminals with alkenyl-containing organosilyl groups, is free of alkenyl groups in side molecular chains, and has a degree of polymerization in the range of 2,500 to 100,000;
      1 to 50 mass % of an alkenyl-containing diorganopolysiloxane (A2) having two or more alkenyl groups in a side molecular chain and having a degree of polymerization in the range of 2,500 to 100,000;
    10 to 100 parts by mass of a fine silica powder (B) having specific surface area in the range of 50 $m^2/g$ to 400 $m^2/g$;
    0.1 to 10 parts by mass of an organohydrogenpolysiloxane (C) having in one molecule at least two silicon-bonded hydrogen atoms; and
    0.1 to 5 part by mass of an organic peroxide (D).

The heat-curable silicone rubber composition of the invention is suitable for forming a rubber laminate composed of strongly bonded layers of a silicone-rubber and a rubber layer other than silicone, the laminate being formed by subjecting both layers to cross-linking and curing simultaneously while these layers are maintained in mutual contact. In particular, the composition is suitable for forming a rubber laminate that demonstrates good interlayer-bonding properties with respect to a hard-to-bond fluororubber layer. The aforementioned rubber laminate preserves strong bonding between the silicone-rubber layer and a layer of rubber other than silicone even after exposure to harsh high-temperature environment at temperatures exceeding 200° C. The method of the invention is efficient in that it allows manufacturing of the aforementioned rubber laminate with high efficiency and under industrial conditions.

BEST MODE FOR CARRYING OUT THE INVENTION

The alkenyl-containing diorganopolysiloxane (A) is one of the main components of the heat-curable silicone rubber composition of the invention. It comprises constituents (A1) and (A2) described below. The weight ratio of (A1):(A2) ranges from 50:50 to 99:1 and should preferably be in the range of 60:40 to 98:2. If constituent (A1) is used in an amount which is too small, or if constituent (A2) is used in excess, it will be difficult to provide sufficiently strong interlayer bonding in a rubber laminate obtained by simultaneously cross-linking and curing the silicone-rubber composition of the invention and a layer of rubber other than silicone rubber when both layers are maintained in mutual contact. If constituent (A1) is used in an excessive amount and the amount of constituent (A2) is too small, it will be difficult to provide strong interlayer bonding after exposure of the rubber laminate to the effect of a high-temperature environment.

It is recommended to have component (A) with a linear molecular structure, however, within the limits that are not detrimental to resilient properties in the product obtained by cross-linking and curing the heat-curable silicone rubber of the invention, component (A) with a partially-branched molecular structure is also acceptable.

Constituent (A1) is an alkenyl group containing diorganopolysiloxane that is capped at molecular terminals with alkenyl-containing organosilyl groups, and is free of alkenyl groups in side molecular chains. This is an important constituent, which in combination with the below-described constituent (A2) and component (C), imparts strong bonding properties to a rubber laminate obtained by simultaneously cross-linking and curing the silicone-rubber composition of the invention and a layer of rubber other than silicon rubber, even after exposure to high temperature environment. Constituent (A1) may comprise a diorganopolysiloxane capped at both molecular terminals with alkenyldiorganosilyl groups. Constituent (A1) is a gum-like substance that has a degree of polymerization in the range of 2,500 to 100,000, preferably in the range of 3,000 to 20,000. If necessary, constituent (A1) may comprise a combination of two or more appropriate diorganopolysiloxanes of the aforementioned type having different molecular structures and degrees of polymerization. Here, the degree of polymerization is a value determined from a polystyrene-referenced number-average molecular weight measured by gel permeation chromatography (GPC).

Alkenyl groups of constituent (A1) may be exemplified by vinyl, allyl, butenyl, or hexenyl groups, of which vinyl groups are preferable from the cost viewpoint. Silicon-bonded groups other than alkenyl groups may be exemplified by non-substituted or substituted monovalent hydrocarbon groups having 1 to 20 carbon atoms, preferably 1 to 8 carbon atoms. Such groups may be represented by methyl, ethyl, propyl, butyl, or similar alkyl groups; cyclohexyl, or similar cycloalkyl groups; phenyl, tolyl, or similar aryl groups, benzyl, β-phenylpropyl, or similar aralkyl groups; chloromethyl, trifluoropropyl, cyanoethyl, or similar groups of the aforementioned type wherein a part or all carbon-bonded hydrogen atoms are substituted with halogen atoms or cyano groups. Most preferable of the above groups are alkyl, in particular methyl groups, especially if more than 50 mole %, preferably more than 80 mole %, and most preferably more than 95 mole % of silicon-bonded groups are methyl groups.

Constituent (A2) is a diorganopolysiloxane having at least two alkenyl groups in side molecular chains. Constituent (A2) is an important constituent, which in combination with constituent (A1) imparts excellent interlayer bonding properties to a rubber laminate produced by simultaneously cross-linking and curing the heat-curable silicone rubber composition and a rubber composition other than the silicone-rubber composition, when during cross-linking the aforementioned compositions are maintained in mutual contact. Constituent (A2) is a gum-like substance that has a degree of polymerization in the range of 2,500 to 100,000, preferably in the range of 3,000 to 20,000. Similar to the previous case, here the degree of polymerization is a value determined from a polystyrene-referenced number-average molecular weight measured by gel permeation chromatography (GPC).

Alkenyl groups present in constituent (A2) may be exemplified by the same appropriate groups that were mentioned above, of which vinyl groups are preferable. From the viewpoint of improved balance between the interlayer bonding properties with the aforementioned rubber layer other than the silicone layer and mechanical strength of the cross-linked body obtained by cross-linking and curing the aforementioned heat-curable silicone rubber composition of the invention, it is recommended that constituent (A2) contain alkenyl groups in the amount of 0.4 to 1.8 mass %. In addition to side molecular chains, the alkenyl groups may also exist on molecular terminals. Furthermore, in addition to the alkenyl groups, this constituent may contain other silicon-bonded groups which are the same as corresponding groups mentioned above, of which preferable are alkyl groups, in particular methyl groups. It is recommended that more than 50 mole %, preferably more than 80 mole %, and most preferably more than 95 mole % of silicon-bonded groups be methyl groups. Constituent (A2) may comprise a combination of two or more of the aforementioned diorganopolysiloxanes that have different molecular structures, degrees of polymerization, contents of alkenyl groups, etc.

The fine silica powder that constitutes component (B) used in the heat-curable silicone rubber composition of the present invention is used for imparting excellent mechanical strength to the cured body obtained by cross-linking and curing the heat-curable silicone rubber composition of the invention. The aforementioned fine silica powder may be represented by fumed silica powder or a similar dry-process silica; precipitated silica, or a similar wet-process silica; or the aforementioned silicas subjected to hydrophobic surface treatment with organosilane, hexaorganodisilazane, diorganopolysiloxane, diorganocyclopolysiloxane, or similar organosilicon compounds. The fine silica powder should have a diameter of particles equal to or less than 50 μm. Furthermore, its specific surface area should be in the range of 50 $m^2/g$ to 400 $m^2/g$, preferably in the range of 100 $m^2/g$ to 400 $m^2/g$, Component (B) should be used in an amount of 10 to 100 parts by mass per 100 parts by mass of component (A). If component (B) is used in an amount less than 10 parts by mass, a body obtained after curing the heat-curable silicone rubber composition of the invention will have insufficient mechanical strength. If, on the other hand, the content of component (B) exceeds 100 parts by mass, this will impair compounding thereof with component (A).

The organohydrogenpolysiloxane that constitutes component (C) contains in one molecule at least two silicon-bonded hydrogen atoms. This is an important component that imparts strong interlayer bonding properties to a rubber laminate obtained by simultaneously cross-linking and curing the silicone-rubber composition of the invention and a layer of rubber other than silicon rubber. Silicon-bonded groups other than hydrogen atoms can be exemplified by the same other groups as those mentioned with regard to constituent (A1), preferable of which are alkyl groups, especially methyl groups. The organohydrogenpolysiloxane of component (C) may have a linear, partially branched, net-like, cyclic, or a three-dimensional molecular structure. This component may comprise a single polymer, or a mixture of two or more polymers. There are no special restrictions with regard to viscosity of organohydrogenpolysiloxane (C) at 25° C., but normally this component has a viscosity ranging from 0.5 to 50,000 mPa·s, preferably from 1 to 10,000 mPa·s. Component (C) is used in the amount of 0.1 to 10 parts by mass per 100 parts by mass of component (A). If organohydrogenpolysiloxane (C) is used in the amount less than the recommended lower limit, the bonding force between the layers in the rubber laminate obtained by simultaneously cross-linking and curing the silicone-rubber composition of the invention and a layer of rubber other than silicone rubber when both layers are maintained in mutual contact will be insufficient. If, on the other hand, the content of component (C) exceeds the recommended upper limit, this will impair either workability of the heat-curable silicone rubber composition of the invention or physical properties of a cured body obtained by cross-linking and curing the composition.

The organic peroxide that constitutes component (D) is used for cross-linking and curing the heat-curable silicone rubber composition of the invention. This component may comprise a conventional compound used for the same purpose. Specific examples of such compounds are the following: benzoyl peroxide, tertiary butyl per-benzoate, orthomethyl benzoyl peroxide, paramethyl benozoyl peroxide, 1,1-bis(tertiary-butylperoxy) 3,3,5-trimethyl cyclohexane, 2,5-dimethyl-2,5-di(tertiary-butyl-peroxy)hexane, or 2,5-dimethyl-2,5-di(tertiary-butyl peroxy)hexyne. These compounds are used individually or in combination of two or more. The organic peroxide of component (D) is used in the amount of 0.1 to 5 parts by mass per 100 parts by mass of component (A).

Within the limits which do not contradict to the objects of the invention, the heat-curable silicone rubber composition of the invention may be combined with various agents, such as diatomaceous earth, quartz powder, calcium carbonate or similar extender; titanium oxide, carbon black, red oxide, or similar pigments; rare-earth type oxides, cerium lanolate, cerium fatty-acid salts, or similar heat-resistant agents; stearic acid, zinc stearate, calcium stearate, or similar fatty aids or their metal salts, or other mold-release agents.

The aforementioned rubber material other than the silicone rubber used in the rubber laminate of the present invention is exemplified by fluororubber; acrylonitrile-butadiene copolymer, hydrogenated acrylonitrile-butadiene copolymer, or a similar acrylonitrile rubber; acrylic rubber, a copolymer of ethylene and acrylic acid ester, a copolymer of vinyl acetate, ethylene, and acrylic acid ester; EPM, EPDM, or a similar ethylene-propylene type rubber. The fluororubber is preferable.

There are no special restrictions with regard to the fluororubber suitable for use in the rubber laminate of the present invention. The polymers of the following compounds are examples of the aforementioned fluororubber: vinylidene fluoride (VdF), hexafluoropropylene (HFP), pentafluoropropylene, trifluoroethylene, trifluorochloroethylene (CTFE), tetrafluoroethylene (TFE), vinylfluoride, perfluoro (methylvinylether), perfluoro (propylvinylidene), etc. Other examples may include compounds that can be used as a monomer copolymerizable with the aforementioned compounds, such as acrylic acid esters or similar vinyl compounds, propylene or similar olefin compounds or diene compounds, as well as halogenated vinyl compounds that contain chlorine, bromine, or iodine, or other copolymerized rubbers. Specific examples of such copolymers are the following: a copolymer of VdF and HFP, a copolymer of VdF and TFE, a copolymer of VdF and CTFE, a trimer of TFE, propylene, and VdF, a trimer of TFE, HFP, and VdF, a copolymer of HFP, ethylene, and VdF, a copolymer of fluoro (alkylvinylether) and olefin (e.g., a copolymer of VdF, TFE, and perfluoro (alkylvinylether)), or a copolymer of THF and propylene. Most preferable of the above compounds are the trimer of TFE, propylene, and VdF, the trimer of TFE, HFP, and VdF, and the copolymer of VdF and HFP.

There are no special restrictions with regard to a method that can be used for cross-linking and curing the fluororubber, and appropriate conventional method can be used for this purpose. For example, this may be peroxide-based curing by mixing with an organic peroxide and, if necessary, with a bifunctional vinyl monomer, or a similar cross-linking-assisting agent; polyol-based curing by mixing with 2,2-bis(4-hydroxyphenyl) propane, or a similar polyol compound and, if necessary, with a quaternary ammonium salt, or a similar cross-linking assistant; polyamine curing based on the use of hexamethylene diamine carbamate; or polythiol curing based on the use of dimercaptodimethyl ether, or a similar sulfur-containing compound and, if necessary, of a quaternary ammonium salt or a similar cross-linking assistant. Most preferable from the viewpoint of imparting excellent heat-resistant properties are the peroxide-based curing method and the polyol-based curing method.

The fluororubber can be combined with other components such as a silica-type filler, a plasticizer such as a phthalic-acid derivative, adipic acid derivative, sebacic acid derivative, a softener such as lubricating oil, process oil, castor oil, anti-oxidants such as phenylene diamines, phosphates, quinolines, cresols, phenols, dithiocarbamate metal salts, etc.

The rubber laminate of the present invention is produced by simultaneously heating and thus cross-linking and curing the heat-curable silicone composition of the present invention and a heat-curable rubber composition other than silicone composition, e.g., a fluororubber composition or the like which is compounded with a curing agent, both compositions being maintained in mutual contact during curing. There are no special restrictions with regard to the curing conditions but it may be recommended to conduct this process under a pressure in the range of 2 to 100 kg/cm$^2$ and at a temperature ranging from 100 to 200° C. Molding can be carried out by a compression-molding method; an injection-molding method; and extruding method which the heat-curable rubber composition of the invention and the rubber composition other than the silicone composition is continuously extruded with an extruder and the rubber laminate is cured, e.c. by steam heating. If necessary, after molding the product can be subjected to secondary vulcanization by heat-treating the obtained rubber laminate.

There are no special restrictions with regard to the form of the rubber laminate of the invention. For example, this can be a two-layer laminate, a three-layer laminate, or a laminate having more than three layers, or a multiple-layer product having fiber-reinforces layers. Specific examples are the following: a rubber laminate having the inner layer made from a fluororubber or another rubber different from silicone rubber and the external layer made from the silicone rubber; a rubber laminate having the inner layer made from a fluororubber or another rubber different from silicone rubber, an intermediate layer made from the silicone rubber, and the external layer made from a fluororubber or another rubber different from silicone rubber; or a rubber laminate having the inner layer made from a fluororubber or another rubber different from silicone rubber, an intermediate layer made from the silicone rubber, and the external layer made from a fiber-reinforced layer.

PRACTICAL EXAMPLES

The invention will be further described by way of practical and comparative examples, which, however, should not be construed as limiting the scope of the invention.

[Preparation of Heat-Curable Silicone Rubber Composition]

A kneader mixer was loaded with an organopolysiloxane, a dimethylpolysiloxane capped at both molecular terminals with hydroxyl groups, and silica in the proportions shown in Table 1. The components were mixed and kneaded for 30 min. at 30° C. and then for 60 min. at 170° C., whereby a silicone-rubber composition was produced. In proportions shown in Table 1, the obtained composition was compounded with an organohydrogenpolysiloxane and dicumylperoxide, whereby a heat-curable silicone rubber composition was produced.

[Preparation of Heat-curable Fluororubber Compositions 1, 2, and 3]

100 parts by mass of DAI-EL G-902 (the product of Daikin Industries, Ltd.) were combined with 2.0 parts by mass of PERHEXA® 25B (2,5-dimethyl-2-di(t-butylperoxy) hexane (the product of NOF Co.), whereby heat-curable fluororubber composition 1 was produced. Furthermore, 100 parts by mass of Dyneon FLS-2650 (the product of 3M Co., Inc.) were combined with 2.0 parts by mass of PERHEXA® (2,5-dimethyl-2-di(t-butylperoxy) hexane (the product of NOF Co.), whereby heat-curable fluororubber composition 2 was produced. Similarly, 100 parts by mass of polyol-curable DAI-EL G-558 (compounded with Polyol) (the product of Daikin Industries, Ltd.) were compounded with 3 parts by mass of magnesium oxide and 6 parts by mass of calcium hydroxide, whereby heat-curable fluororubber composition 3 was produced.

[Preparation of Rubber Laminate]

A non-cross-linked sheet having a thickness of 0.5 mm was produced by kneading a heat-curable fluororubber composition in a two roll mill with heating at 60° C. A non-cross-linked sheet having a thickness of 3 mm was produced by kneading a heat-curable silicone rubber composition in a two roll mill with roll temperature of 30° C. Following this, the sheet of the non-cross-linked fluororubber sheet was wound onto an aluminum cylinder having a diameter of 150 mm. The sheet of the non-cross-linked silicone rubber was wound onto the first-mentioned sheet and then a cloth was wound on the sheet of the non-cross-linked silicone rubber to secure those rubber sheets to the cylinder, and then the unit was heated for 20 min. at 150° C. in a steam autoclave. The unit treated in the above-described manner was removed from the autoclave, the cured body was disconnected from the cylinder and heated in an oven for 12 hours at 200° C., whereby a rubber laminate was produced.

[Evaluation of Bonding Strength]

The rubber laminate produced by the method described above was retained for 24 hours at room temperature and then was cut into 25 mm-wide ribbons which were used for evaluating initial bonding strength between the silicone-rubber layer and the fluororubber layer by a T-type peel method. Furthermore, the rubber laminate obtained by the aforementioned method was for the second time retained in an oven, but for 72 hours at 220° C., and, after the above-mentioned ageing was completed, the laminate was evaluated with regard to the bonding strength by a T-type peel test. The bonding strength between the silicone-rubber layer and the fluororubber layer was evaluated as excellent when the peeling test showed high resistance to peeling and when cohesive failure was observed. The bonding strength was evaluate as low when peeling occurred without resistance with separation over the interface, and the test results were qualified as non-applicable (NA) when during the T-type peel test the silicone-rubber layer was ruptured.

Practical Examples 1 to 5 and Comparative Examples 1 to 5

Properties of the rubber laminate produced by the above-described method from the heat-curable silicone rubber composition and the heat-curable fluoro-rubber composition were studied on the basis of bonding strength between the silicone and fluororubber layers prior to and after ageing. The results are shown in Table 1.

TABLE 1

|  | Practical Examples | | | | | Comparative Examples | | | | |
| --- | --- | --- | --- | --- | --- | --- | --- | --- | --- | --- |
|  | 1 | 2 | 3 | 4 | 5 | 1 | 2 | 3 | 4 | 5 |
| A1 Organopolysiloxane a1 | 95 | 90 | 60 | 95 | 90 | 100 | 40 | — | 95 | 95 |
| A2 Organopolysiloxane a2 | 5 | — | — | 5 | — | — | — | — | 5 | 5 |
| A2 Organopolysiloxane a3 | — | 10 | 40 | — | 10 | — | 60 | — | — | — |
| A2 Organopolysiloxane a4 | — | — | — | — | — | — | — | 100 | — | — |
| B Silica b1 | 36 | 36 | 36 | — | — | 36 | 36 | 36 | 36 | — |
| B Silica b2 | — | — | — | 36 | 36 | — | — | — | — | 36 |
| Dimethylpolysiloxane having both molecular terminals capped with hydroxyl groups | 10 | 10 | 10 | 1.5 | 1.5 | 10 | 10 | 10 | 10 | 1.5 |
| C Organohydrogen-polysiloxane c1 | 2.2 | 2.2 | 2.2 | 2.1 | 2.1 | 2.2 | 2.2 | 2.2 | — | — |
| D Dicumyl peroxide | 1.5 | 1.5 | 1.5 | 1.4 | 1.4 | 1.5 | 1.5 | 1.5 | 1.5 | 1.4 |
| Bonding strength of heat-curable fluororubber composition 1 prior to ageing | Excellent | | | | | Poor | NA | | Excellent | |
| Bonding strength of heat-curable fluororubber composition 1 after ageing | Excellent | | | | | Poor | NA | | Poor | |
| Bonding strength of heat-curable fluororubber composition 2 prior to ageing | Excellent | | | | | Poor | NA | Poor | Excellent | |
| Bonding strength of heat-curable fluororubber composition 2 after ageing | Excellent | | | | | Poor | NA | | Poor | |

TABLE 1-continued

|  | Practical Examples | | | | | Comparative Examples | | | | |
| --- | --- | --- | --- | --- | --- | --- | --- | --- | --- | --- |
|  | 1 | 2 | 3 | 4 | 5 | 1 | 2 | 3 | 4 | 5 |
| Bonding strength of heat-curable fluororubber composition 3 prior to ageing | | | Excellent | | | Poor | NA | | Excellent | |
| Bonding strength of heat-curable fluororubber composition 3 after ageing | | | Excellent | | | Poor | NA | | Poor | |

Designations used in Table 1 have the following meanings:
Component (A)
Constituent (A1)
Organopolysiloxane a1: dimethylpolysiloxane gum capped at both molecular terminals with vinyldimethylsilyl groups and having degree of polymerization of about 5,000
Constituent (A2)
Organopolysiloxane a2: gum copolymer of methylvinylsiloxane and dimethylpolysiloxane capped at both molecular terminals with hydroxyl groups and having degree of polymerization of about 4,000 (vinyl-group content: 1.45 mass %)
Organopolysiloxane a3: gum copolymer of methylvinylsiloxane and dimethylpolysiloxane capped at both molecular terminals with dimethylvinylsilyl groups and having degree of polymerization of about 5,000 (vinyl-group content: 0.72 mass %)
Organopolysiloxane a4: gum copolymer of methylvinylsiloxane and dimethylpolysiloxane capped at both molecular terminals with dimethylvinylsilyl groups and having degree of polymerization of about 5,000 (vinyl-group content: 0.07 mass %)
Component (B)
Silica b1: fumed silica with specific surface area of 200 $m^2/g$
Silica b2: fumed silica having specific surface area of 160 $m^2/g$ and hydrophobically surface treated with octamethyl-cyclotetrasiloxane
Component (C)
Organohydrogenpolysiloxane C1: copolymer of methylhydrogensiloxane and dimethylsiloxane having viscosity of 15 mPa · s at 25° C. and represented by the following average molecular formula: $Me_3SiO\ (Me_2SiO)_{12}\ (MeHSiO)_{15}\ SiMe_3$
Component (D)
Dicumyl peroxide (used as a peroxide type curing agent)
Other components
Dimethylpolysiloxane capped at both molecular terminals with hydroxyl groups: dimethylpolysiloxane capped at both molecular terminals with hydroxyl groups and having viscosity of 40 mPa · s at 25° C.; used as a treatment agent for silica (B)

INDUSTRIAL APPLICABILITY

The rubber laminate of the present invention is characterized by strong bonding between the silicone rubber layer and the fluororubber layer, as well as by excellent properties such as resistance to heat, resistance to oil, resistance to fuel oil, resistance to LLC [long life coolant], resistance to steam, and weather-proof properties. In view of the above the aforementioned rubber laminate may be used for manufacturing gaskets, non-contact or contact-type packings, bellows, or similar sealing members (which in the automotive industry can be used as sealing elements for engine casings, main-drive systems, valve systems, lubrication and cooling systems, fuel systems, suction-exhaust systems; transmissions of chassis and drive systems, steering systems, braking systems; basic parts of electrical equipment, electrical parts of control systems, parts of electrical installations, etc.); valves, tire frames; fuel-supply hoses, oil-supply hoses, gas-supply hoses, brake-fluid supply hoses, steam-supply hoses, chemically resistive hoses, or other hoses or tubes of the aforementioned type; appropriate use in electric wirings, etc. The rubber laminate of the invention may find application also in equipment of chemical plants, food industry, nuclear plants, or in general industrial equipment. In addition to the use in automotive industry, the rubber laminate may find application in other transportation means such as ships and aircrafts.

The invention claimed is:

1. A rubber laminate obtained by simultaneously cross-linking and curing a heat-curable fluororubber composition and a heat-curable silicone composition, both compositions being in contact with each other during cross-linking;
the heat-curable silicone rubber composition comprising:
100 parts by mass of an alkenyl-containing diorganopolysiloxane (A) that comprises:
50 to 99 mass % of an alkenyl-containing diorganopolysiloxane (A1) that is capped at molecular terminals with alkenyl-containing organosilyl groups, is free of alkenyl groups in side molecular chains, and has a degree of polymerization in the range of 2,500 to 100,000;
1 to 50 mass % of an alkenyl-containing diorganopolysiloxane (A2) having two or more alkenyl groups in side molecular chains and having a degree of polymerization in the range of 2,500 to 100,000;
10 to 100 parts by mass of a fine silica powder (B) having specific surface area in the range of 50 $m^2/g$ to 400 $m^2/g$;
0.1 to 10 parts by mass of an organohydrogenpolysiloxane (C) having in one molecule at least two silicon-bonded hydrogen atoms; and
0.1 to 5 part by mass of an organic peroxide (D).

2. The rubber laminate according to claim 1, wherein the rubber laminate comprises a silicone-rubber layer and a fluororubber layer.

3. The rubber laminate according to claim 2, wherein the content of alkenyl groups in constituent (A2) ranges from 0.4 to 1.8 mass %.

4. The rubber laminate according to claim 1, wherein the content of alkenyl groups in constituent (A2) ranges from 0.4 to 1.8 mass %.

5. The rubber laminate according to claim 4, wherein, in addition to the alkenyl groups, constituent (A2) contains other silicon-bonded groups which are alkyl groups.

6. The rubber laminate according to claim 5, wherein more than 50 mole % of silicon-bonded groups in constituent (A2) are the alkyl groups.

7. The rubber laminate according to claim 6, wherein the alkyl groups are methyl groups.

8. The rubber laminate according to claim 1, wherein constituent (A1) is present at 60 to 98 mass %, and constituent (A2) is present at 2 to 40 mass %.

9. The rubber laminate according to claim 1, wherein the degree of polymerization of constituent (A1) is in the range of 3,000 to 20,000.

10. The rubber laminate according to claim 1, wherein the degree of polymerization of constituent (A2) is in the range of 3,000 to 20,000.

11. The rubber laminate according to claim 1, wherein the alkenyl groups of constituent (A1) are vinyl.

12. A method of manufacturing a rubber laminate comprising the steps of bringing into mutual contact a heat-curable silicone composition and a heat-curable fluororubber composition and simultaneously cross-linking and curing both compositions, wherein the silicone-rubber composition comprises:

100 parts by mass of an alkenyl-containing diorganopolysiloxane (A) that comprises:

50 to 99 mass % of an alkenyl-containing diorganopolysiloxane (A1) that is capped at molecular terminals with alkenyl-containing organosilyl groups, is free of alkenyl groups in side molecular chains, and has a degree of polymerization in the range of 2,500 to 100,000;

1 to 50 mass % of an alkenyl-containing diorganopolysiloxane (A2) having two or more alkenyl groups in side molecular chains and having a degree of polymerization in the range of 2,500 to 100,000;

10 to 100 parts by mass of a fine silica powder (B) having specific surface area in the range of 50 $m^2/g$ to 400 $m^2/g$;

0.1 to 10 parts by mass of an organohydrogenpolysiloxane (C) having in one molecule at least two silicon-bonded hydrogen atoms; and 0.1 to 5 part by mass of an organic peroxide (D).

* * * * *